United States Patent
Lee (10) Patent No.: US 9,803,710 B2
(45) Date of Patent: Oct. 31, 2017

(54) ELECTRIC DISC BRAKE

(71) Applicant: MANDO CORPORATION, Pyeongtaek-si, Gyeonggi-do (KR)

(72) Inventor: Jae-Hyun Lee, Incheon (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/151,428

(22) Filed: May 10, 2016

(65) Prior Publication Data

US 2016/0333951 A1    Nov. 17, 2016

(30) Foreign Application Priority Data

May 12, 2015    (KR) .................. 10-2015-0065716

(51) Int. Cl.

| F16F 7/12 | (2006.01) |
| F16D 65/18 | (2006.01) |
| F16D 55/227 | (2006.01) |
| F16D 65/56 | (2006.01) |
| F16D 121/24 | (2012.01) |
| F16D 125/36 | (2012.01) |
| F16D 125/52 | (2012.01) |

(52) U.S. Cl.
CPC .......... F16D 65/18 (2013.01); F16D 55/227 (2013.01); F16D 65/567 (2013.01); F16D 2121/24 (2013.01); F16D 2125/36 (2013.01); F16D 2125/52 (2013.01)

(58) Field of Classification Search
CPC ............. F16D 2121/24; F16D 2125/36; F16D 2125/40; F16D 2125/48; F16D 2125/50; F16D 2125/52; F16D 2121/34; F16D 2125/44; F16D 2125/46; F16D 2125/565
USPC ........................................................ 188/377
See application file for complete search history.

(56) References Cited

U.S. PATENT DOCUMENTS

| 2003/0042084 A1* | 3/2003 | Kawase .................. F16D 55/00 188/72.1 |
| 2010/0163351 A1* | 7/2010 | Sakashita ................ B60T 7/107 188/182 |
| 2011/0155520 A1* | 6/2011 | Takahashi ............... F16D 65/18 188/72.6 |
| 2011/0278106 A1* | 11/2011 | Kim ........................ F16D 65/18 188/72.1 |

(Continued)

FOREIGN PATENT DOCUMENTS

KR    10-2013-0034605 A    4/2013

*Primary Examiner* — Anna Momper
*Assistant Examiner* — Mahbubur Rashid
(74) *Attorney, Agent, or Firm* — McDermott Will & Emery LLP (57) ABSTRACT

An electric disc brake is disclosed. An electric disc brake comprises a caliper housing configured to include a cylinder at which a piston is installed to be reciprocally movable by a brake hydraulic pressure, an adjuster arranged inside the piston, a pushrod provided inside the cylinder, an actuator configured to decelerate a rotational force according to an activation of a motor to output the decelerated rotational force through an output gear so as to pressurize the piston, and a ramp unit installed inside the cylinder and configured to receive the decelerated rotational force from the actuator to pressurize the pushrod to the piston so as to prevent rotation of the pushrod.

15 Claims, 9 Drawing Sheets

(56) References Cited

U.S. PATENT DOCUMENTS

| | | | | |
|---|---|---|---|---|
| 2011/0315492 A1* | 12/2011 | Sakashita | ................ | F16D 65/18 |
| | | | | 188/72.1 |
| 2012/0261220 A1* | 10/2012 | Sakashita | ................ | F16D 65/18 |
| | | | | 188/72.6 |
| 2012/0292141 A1 | 11/2012 | Takahashi | | |
| 2013/0001027 A1* | 1/2013 | Baehrle-Miller | ....... | F16D 65/18 |
| | | | | 188/106 F |
| 2013/0075205 A1* | 3/2013 | Sakashita | ................ | F16D 65/18 |
| | | | | 188/72.3 |
| 2015/0203079 A1* | 7/2015 | Sekiguchi | ............... | F16D 65/14 |
| | | | | 188/72.1 |
| 2016/0032993 A1* | 2/2016 | Takei | .................... | B60T 13/741 |
| | | | | 701/70 |
| 2016/0032994 A1* | 2/2016 | Sakashita | ............. | F16D 55/225 |
| | | | | 188/72.3 |

* cited by examiner

ELECTRIC DISC BRAKE

CROSS-REFERENCE TO RELATED APPLICATION

This application claims the benefit of Korean Patent Application No. 2015-0065716, filed on May 12, 2015 in the Korean Intellectual Property Office, the disclosure of which is incorporated herein by reference.

BACKGROUND

1. Field

Embodiments of the present disclosure relate to an electric disc brake, and more particularly, to an electric disc brake capable of easily controlling an actuator when a parking brake force is released and preventing a damage to a component due to an excessive releasing of the parking brake force.

2. Description of the Related Art

Generally, an electric disc brake is a device for braking a vehicle by forcibly squeezing a friction pad against both sides of a disc rotated together with a wheel of the vehicle, and for performing a parking brake function by being electrically activated to maintain a stationary state of the vehicle upon a parking thereof. Such an electric disc brake is provided with a pair of pad plates disposed at both sides of a disc and squeezing the disc to generate a brake force, a carrier supporting the pair of pad plates, a caliper housing slidably installed at the carrier so as to squeeze the pair of pad plates and having a piston moved by a brake hydraulic pressure, and an actuator actuating the piston by a mechanical mechanism.

The electric disc brake may employ a so-called ball in ramp (BIR) form including a fixing ramp plate fixedly installed inside the caliper housing, a rotating ramp plate being rotated by the actuator, a ball installed between the fixing ramp plate and the rotating ramp plate to advance the rotating ramp plate upon a rotation thereof, a pushrod for pushing the piston in contiguity with the rotating ramp plate, an adjuster screw-coupled to the pushrod, and a spring for returning the pushrod to an initial position thereof.

Such a BIR form is typically referred to as a BIR caliper type, and an electric disc brake of a BIR caliper type is disclosed in U.S. Patent Application Publication No. 2012-0292141, Korean Patent Laid-Open Publication No. 2013-0034605, and the like. According to the disclosures in these literatures, the electric disc brake is configured to generate a parking brake force by delivering a rotational force generated from a motor of an actuator to a rotating ramp plate of a ramp unit through a decelerator (a gear assembly), converting a rotational movement into a rectilinear movement to push a pushrod, and tightly squeezing a friction pad against a disc by pushing a piston by means of the pushrod together with an adjuster.

At this point, the rotating ramp plate is directly engaged with a final output gear among gears of the decelerator to receive the rotational force, thereby being rotated in a direction at which a parking brake force is applied or released.

The electric disc brake described above, however, has problems in which a precise control is required to equalize a rotation amount of the rotating ramp plate for releasing the parking brake force with that of the rotating ramp plate for generating the same, and also a separate sensor should be provided for the precise control. Consequently, a manufacture cost may be increased.

Also, when the parking brake force is released, there is a problem in which a drag phenomenon caused by a continuous contact between the disc and the friction pad due to a residual parking brake force occurs if the rotation amount of the rotating ramp plate is insufficient.

Moreover, when a rotational force is excessively delivered upon releasing the parking brake force, a ball may be escaped from a ramp unit or an excessive weight is applied to internal components to cause damage thereto.

PRIOR ART LITERATURE

Patent Literatures (Patent Literature 1) US 2012-0292141 A (AKEBONO BRAKE INDUSTRY CO., LTD.), Nov. 22, 2012, FIG. 1.

(Patent Literature 2) Korean Patent Laid-Open Publication No. 2013-0034605 (HITACHI AUTOMOTIVE SYSTEMS, LTD.), Apr. 5, 2013, FIG. 1.

SUMMARY

Therefore, in accordance with one embodiment of the present disclosure, an electric disc brake is provided to prevent an excessive rotational force from being delivered to a rotating ramp plate converting a rotational movement into a rectilinear movement, when the excessive rotational force is generated upon releasing a parking brake force, by rotatably coupling a connector delivering the rotational force to the rotating ramp plate to an output gear, thereby delivering the rotational force through the connector only in a direction at which the parking brake force is generated.

In accordance with one aspect of the present invention, there is provided an electric disc brake, which comprises a caliper housing configured to include a cylinder at which a piston is installed to be reciprocally movable by a brake hydraulic pressure, an adjuster arranged inside the piston, a pushrod provided inside the cylinder, an actuator configured to decelerate a rotational force according to an activation of a motor to output the decelerated rotational force so as to pressurize the piston, and a ramp unit installed inside the cylinder and configured to receive the decelerated rotational force from the actuator to pressurize the pushrod toward the piston so as to prevent rotation of the pushrod, wherein the actuator includes an output gear rotatably connected to the motor, wherein the electric disc brake further comprises a connector configured to deliver the decelerated rotational force of the output gear to the ramp unit in one direction, and wherein the connector and the output gear deliver the rotational force of the motor when the motor is activated in a direction pressurizing the piston, and do not deliver the rotational force of the motor when the motor is activated in a direction not pressurizing the piston.

Also, the push rod includes a front part screw-coupled to the adjuster and a rear part at which a flange extending in a radial direction is formed, wherein the electric disc brake further comprises an elastic member provided in a spring case formed between an inner circumferential surface of the cylinder and the pushrod and configured to provide an elastic force to the pushrod.

Also, at least one protrusion spaced apart from the center in the radial direction by a predetermined distance is formed at one lateral surface of the output gear, the connector is rotatably installed at a center of the output gear to be coupled to a rotating ramp plate of the ramp unit, and a supporting unit is provided in a circumferential direction at which the at least one protrusion is rotated so as to receive the rotational force through the protrusion formed at the output gear.

Also, the connector is rotated in a direction at which the output gear generates a parking brake force from a time when the protrusion comes in contact with the supporting unit, thereby delivering the rotational force to the rotating ramp plate.

Also, the protrusion is rotated in a direction away from the supporting unit when the output gear is rotated in a direction at which the parking brake force is released, and the connector is reversely rotated the same as a rotation amount of the rotating ramp plate in the direction at which the parking brake force is generated to be rotated together with the rotating ramp plate, thereby preventing the protrusion and the supporting unit from coming in contact with each other.

Also, a friction member is installed at an outer circumferential surface of the connector to apply a constant rotational resistance against the output gear.

Also, when a parking brake force is released, if torque of the pushrod pressurizing the rotating ramp plate is less than a friction force between the friction member and the output gear, the connector is rotated together with the output gear.

Also, from a time when the rotating ramp plate returns to an initial position, torque between the connector and the rotating ramp plate is increased such that the friction member slides against the output gear and the output gear is rotated alone.

Also, the connector includes a body rotatably installed at the center of the output gear, a coupling unit provided at one side of the body to be coupled to the rotating ramp plate, and a supporting unit provided at the other side of the body and formed to extend in the radius direction.

Also, the ramp unit includes a fixing ramp plate having a front part being opened and fixed to the cylinder, the rotating ramp plate provided inside the fixing ramp plate and coupled to the connector by passing through a rear part of the fixing ramp plate and a rear part of the cylinder to be rotated by receiving the rotational force, and a plurality of balls interposed between the rotating ramp plate and the pushrod to advance the pushrod when the rotating ramp plate is rotated.

Also, a rotation prevention protrusion protruding in an outward direction is formed at the rear part of the fixing ramp plate, and a rotation prevention recessed groove corresponding to the rotation prevention protrusion is formed at a position corresponding thereto inside the cylinder.

Also, the pushrod includes a plurality of coupling protrusions spaced apart from each other at a regular interval along an outer circumferential surface of the flange and protruding in an outward direction, and coupling recessed grooves corresponding to the plurality of coupling protrusions are formed at positions corresponding to the plurality of coupling protrusions on an inner circumferential surface of the fixing ramp plate so as to prevent rotation of the pushrod.

Also, the elastic member includes a low pressure spring and a high pressure spring which are provided in parallel in an accommodation space of the spring case to provide an elastic force to the pushrod.

Also, further comprises a supporting plate configured to support one end of the high pressure spring so as to enable the low pressure spring and the high pressure spring to form a gap in a length direction and slidably installed at the cylinder.

Also, a through hole is formed at a center of the supporting plate to seat the supporting plate on a front end surface of a front side of the fixing ramp plate, and the front end surface of the fixing ramp plate is formed to more protrude than a front end surface of the flange arranged inside the fixing ramp plate to form a step between the front end surfaces, thereby forming a gap between the supporting plate and the flange.

Also, the adjuster includes a head portion configured to contact the piston and a rod formed to extend from the head portion in a rear direction and having an outer circumferential surface at which screw threads are formed so as to be screw-coupled to the pushrod, wherein a washer is installed at a rear wall of the head portion of the adjuster and an inward surface of the piston, and a washer spring is provided between the washers to tightly contact the adjuster with the piston by an elastic force of the washer spring.

The electric disc brake in accordance with one embodiment of the present disclosure may include the connector for connecting the output gear of the decelerator to the rotating ramp plate of the ramp unit converting a rotational movement into a rectilinear movement, and deliver a rotational force through the connector only in a direction at which a parking brake force is generated, thereby preventing an escape of a ball, a damage to a component, and the like, even though an excessive rotational force is generated upon releasing the parking brake force.

Also, the friction member having a rotational resistance against the output gear may be provided at the connector such that the connector may be rotated together with the output gear when torque of the pushrod pressurizing the rotating ramp plate is less than a friction force between the friction member and the output gear. Consequently, the rotating ramp plate may completely return to an initial position to prevent a drag phenomenon.

In addition, the low pressure spring operating according to a low pressure and the high pressure spring operating according to a high pressure upon activating a brake operation may be provided to prevent drag by pulling back the piston, and also the low pressure spring and the high pressure spring are formed to have a gap therebetween in a length direction such that a space between the disc and the friction pad may be secured. As a result, abrasion of the friction pad caused by unnecessary friction between the friction pad and the disc and noise resulting from the abrasion may be prevented and also a brake force may be smoothly provided.

Moreover, the adjuster may be provided to constantly maintain a distance between the disc and a pad plate such that an amount of a roll back according to the abrasion of the friction pad pressurizing the disc is increased to prevent a brake force from being reduced at an initial brake operation.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. These embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and not be shown in order to clearly describe the present disclosure and also a size of a component will be somewhat exaggerated to help understanding.

Figure 1:
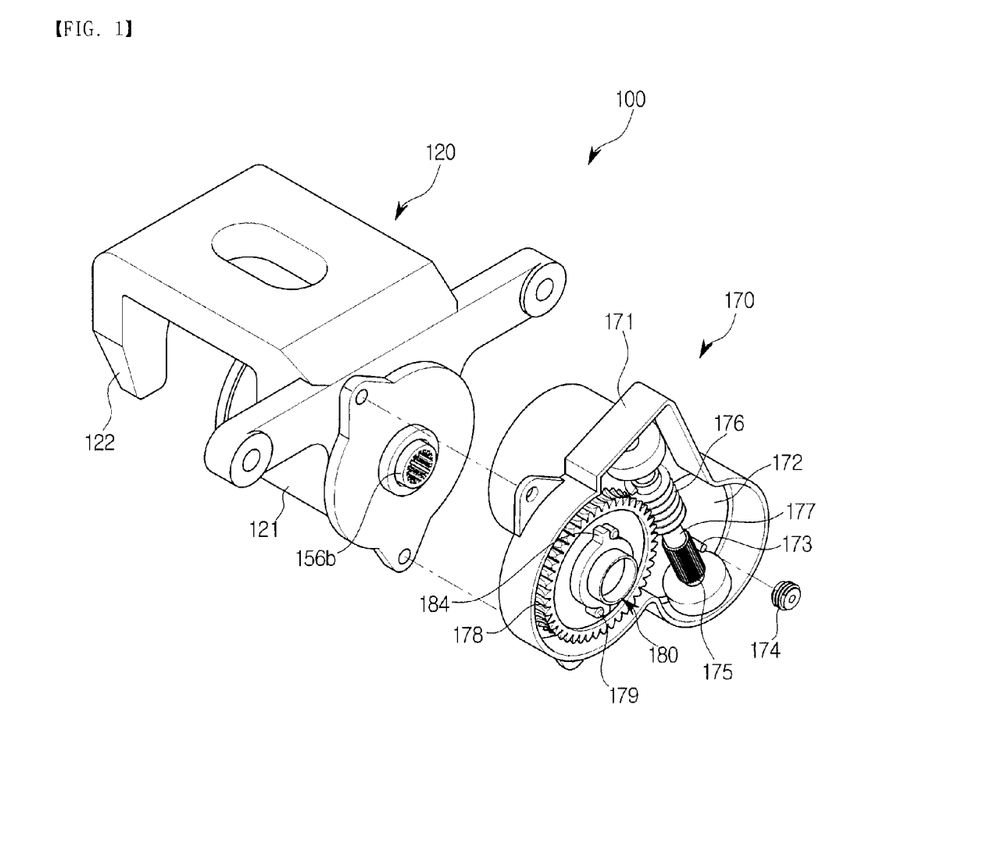
FIG. 1 is an exploded perspective view schematically illustrating an electric disc brake according to one embodiment of the present disclosure.
Figure 2:
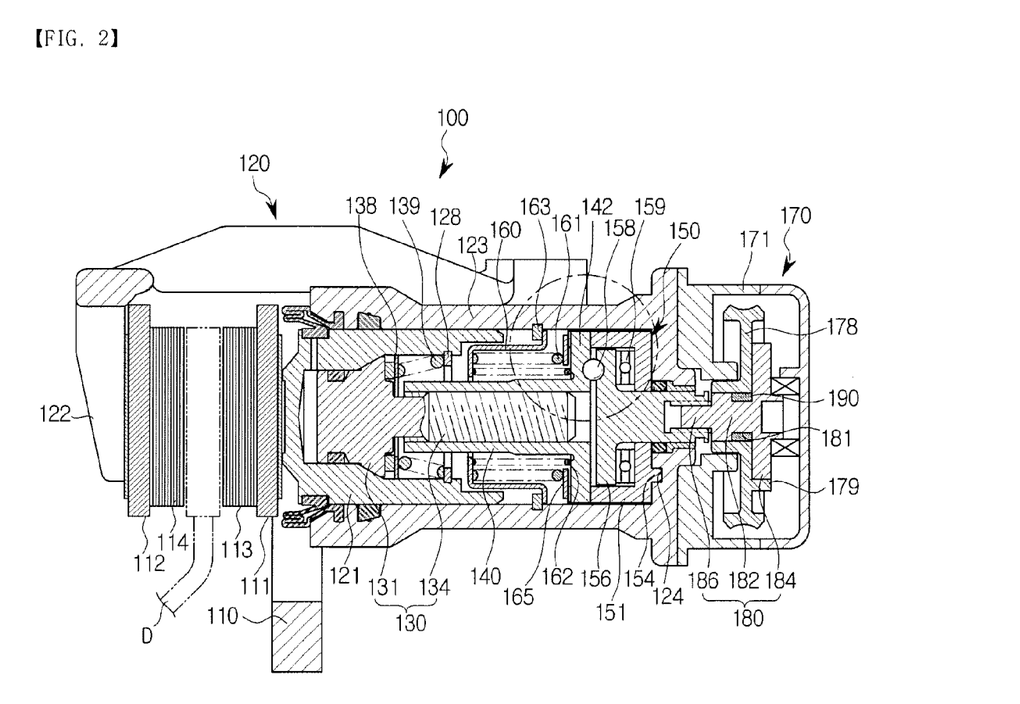
FIG. 2 is a lateral cross-sectional view of an assembly of FIG. 1.
Figure 3:
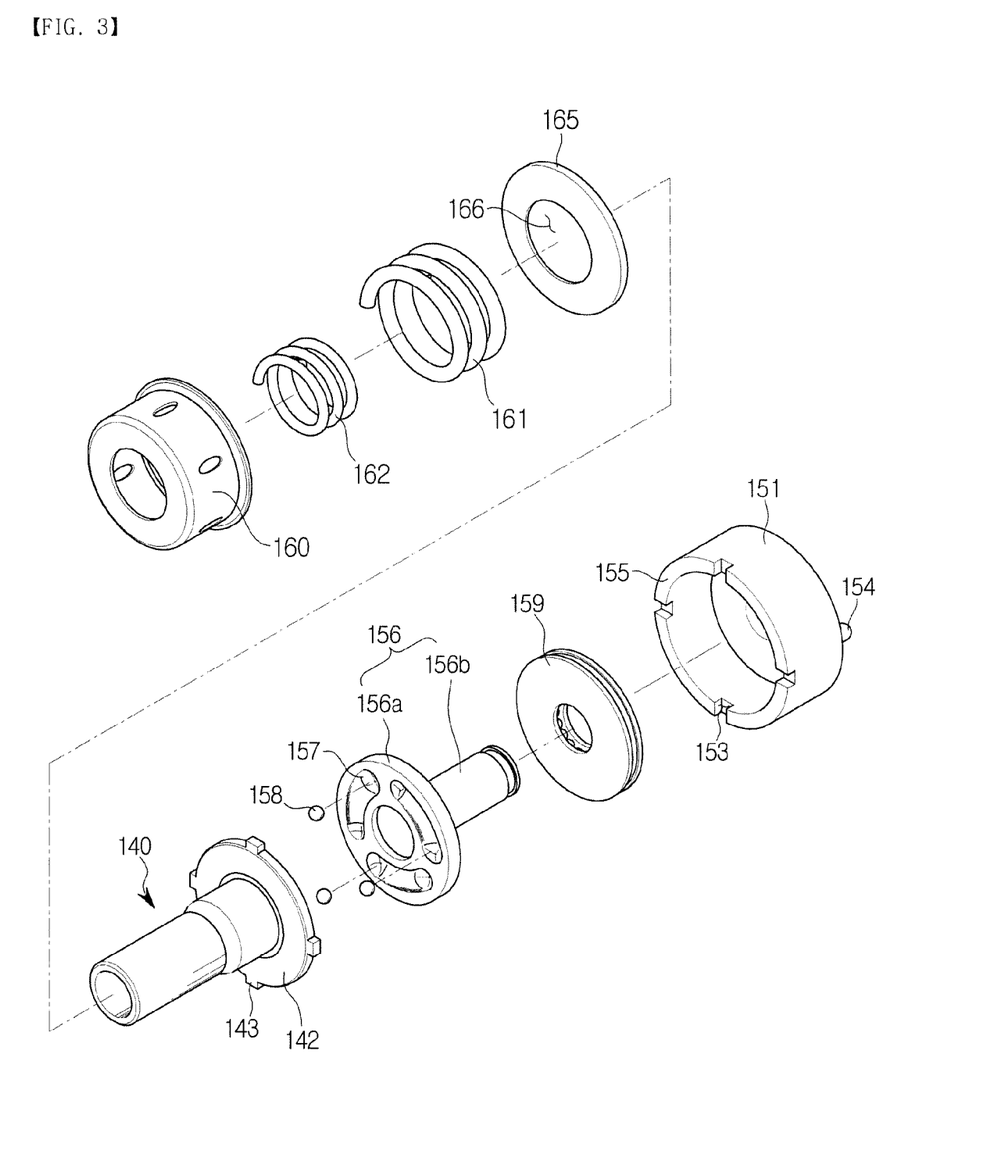
FIG. 3 is an exploded perspective view illustrating an installation state of a pushrod, a low pressure spring, a high pressure spring, and a ramp unit provided in the electric disc brake.
Figure 4:
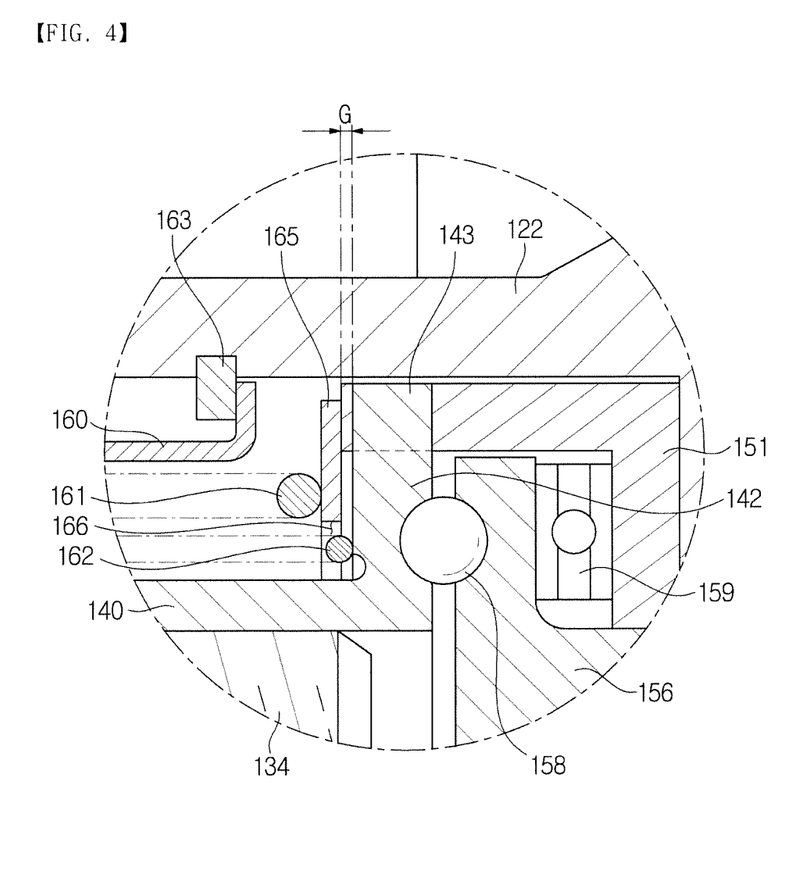
FIG. 4 is a partially magnified view illustrating a state in which a gap is formed between the pushrod provided in the electric disc brake and a supporting plate.

FIG. 1 is an exploded perspective view schematically illustrating an electric disc brake according to one embodiment of the present disclosure, FIG. 2 is a lateral cross-sectional view of an assembly of FIG. 1, FIG. 3 is an exploded perspective view illustrating an installation state of a pushrod, a low pressure spring, a high pressure spring, and a ramp unit provided in the electric disc brake, and FIG. 4 is a partially magnified view illustrating a state in which a gap is formed between the pushrod provided in the electric disc brake and a supporting plate.

With reference to FIGS. 1 to 4, an electric disc brake 100 according to one embodiment of the present disclosure includes a carrier 110 at which a pair of pad plates 111 and 112 configured to squeeze both sides of a disc D rotated together with a wheel (not shown) are installed to be reciprocally movable, a caliper housing 120 slidably installed at the carrier 110 and having a cylinder 123 at which a piston 121 is installed to be reciprocally movable by a brake hydraulic pressure, an adjuster 130 configured to prevent the pair of pad plates 111 and 112 from being away from the disc D to maintain a constant gap therebetween, a pushrod 140 screw-coupled to the adjuster 130, a ramp unit 150 configured to support the pushrod 140 to prevent rotation thereof and installed at the cylinder 123, a spring case 160 configured to form a predetermined accommodation space between an inward side surface of the cylinder 123 and the pushrod 140, elastic members 161 and 162 provided at the spring case 160, an actuator 170 configured to generate a parking brake force, and a connector 180 configured to deliver the parking brake force to the ramp unit 150.

The carrier 110 is fixed to a knuckle of a vehicle body through a mounting bolt (not shown), and the caliper housing 120 is slidably coupled to both ends of the carrier 110 through a guide rod (not shown). Also, the pair of pad plates 111 and 112 are spaced apart from each other in a direction facing each other to be mounted slidably at a center portion of the carrier 110.

The pair of pad plates 111 and 112 are disposed in contact with the piston 121 to be described, and are classified into an inward pad plate 111 having an inward surface to which a friction pad 113 is attached and an outward pad plate 112 disposed in contact with a finger portion 122 and having an inward surface to which a friction pad 114 is attached. At this point, the disc D is provided in a circular-shaped plate rotated together with a wheel (not shown) of a vehicle, and a part of the disc D is inserted into the pair of pad plates 111 and 112 to be rotated as being inserted thereinto.

The caliper housing 120 includes the finger portion 122 configured to actuate the outward pad plate 112, and the cylinder 123 at which the piston 121 is installed to be slidable by a brake hydraulic pressure. At this point, a hydraulic pressure duct (not shown) is formed at one end of the caliper housing 120 so as to enable the cylinder 123 to receive a brake hydraulic pressure.

The finger portion 122 is formed to bend downwardly from a front part of the caliper housing 120 to surround the outward pad plate 112 from the outside. With such a configuration, when a brake operation is activated, as the caliper housing 120 is slid from the carrier 110 to move in a right direction by a reaction force according to a movement of the piston 121, the outward pad plate 112 is pushed to the disc D by the finger portion 122, thereby squeezing the disc D.

The cylinder 123 is formed at a rear part of the caliper housing 120 so as to allow a brake hydraulic pressure formed in a master cylinder (not shown) to be delivered, and the piston 121 is installed at the cylinder 123 to be reciprocally movable. In other words, the piston 121 installed at the cylinder 123 performs a reciprocal movement therein by a brake hydraulic pressure. At such a cylinder 123, the pushrod 140 and the ramp unit 150, which are to be described later, are installed together with the piston 121.

The piston 121 is provided in a cup shape of which one side is opened, and a head portion 131 of the adjuster 130 to be described is inserted into and comes in contact with an inward center portion of the piston 121.

The adjuster 130 is installed inside the piston 121 inserted into the cylinder 123, and includes the head portion 131 to come in contact with the piston 121, and a rod 134 extending from the head portion 131 and having an outer circumference surface at which screw threads are formed. At this point, as described above, the head portion 131 is inserted inside the piston 121 and comes in contact therewith through the opened side thereof.

Such an adjuster 130 serves to prevent a space between the disc D and the pair of pad plates 111 and 112 from being gradually spaced apart from each other as the friction pads 113 and 114 attached to the pair of pad plates 111 and 112 are worn out, thereby maintaining a constant space therebetween. Washers 128 and 138 are respectively installed at an inward surface of the piston 121 and a rear wall of the head portion 131, and a washer spring 139 is provided between the washers 128 and 138. In other words, the adjuster 130 is provided to come in contact with the piston 121 by an elastic force of the washer spring 139 installed between the inward surface of the piston 121 and the head portion 131. With such a configuration, the washer spring 139 pressurizes the adjuster 130 to a front end portion of the piston 121 such that the adjuster 130 and the piston 121 come in contact with each other always in spite of a movement of a position of the piston 121 to the inward pad plate 111 caused by abrasion of the friction pads 113 and 114 of the pad plates 111 and 112 due to friction against the disc D.

The pushrod 140 installed inside the cylinder 123 is screw-coupled to a rear side of the adjuster 130, that is, the rod 134. Therefore, when the piston 121 is advanced by a brake hydraulic pressure, the adjuster 130 coupled to the piston 121 is also advanced. At this point, the pushrod 140 screw-coupled to the adjuster 130 is advanced together. Consequently, the advancing of the adjuster 130 and the pushrod 140 is made by reducing a gap between the screw threads. In other words, although a gap between the screw threads of the adjuster 130 and the pushrod 140 exists generally, since the adjuster 130 is pressurized in an advance direction (a left side) of the piston 121, the gap between the screw threads is reduced such that movements of the adjuster 130 and the pushrod 140 occur simultaneously.

The pushrod 140 is provided in a hollow shape in which a center portion is empty so as to be screw-coupled to the adjuster 130, a screw thread is formed at an inner circumference surface of the pushrod 140, and a flange 142 extending to an inner circumference surface of the cylinder 123 is provided at a rear portion of the pushrod 140. Such a pushrod 140 is supported by the ramp unit 150 which will be described below to be prevented from being rotated. A rotation prevention structure of the pushrod 140 will be described below.

The pushrod 140 prevented from being rotated is screw-coupled to the adjuster 130 such that the adjuster 130 may move in a length direction of the pushrod 140. In other words, when the friction pads 113 and 114 are worn out to move the piston 121, the adjuster 130 is rotated to move from the pushrod 140 as much as a movement distance of the piston 121 according to tendency tightly contacting the piston 121 by means of the washer spring 139, thereby maintaining a state in tight contact with the piston 121. As a result, the space between the disc D and the pad plates 111 and 112 pressurized by the piston 121 is constantly maintained Meanwhile, at the flange 142 of the pushrod 140, a plurality of coupling protrusions 143 are formed to be spaced apart from each other along an outer circumference surface of the flange 142 at a regular interval to protrude in an outward direction thereof. The coupling protrusion 143 is fitted in a coupling recessed groove 153 formed at a fixing ramp plate 151 of the ramp unit 150 to prevent rotation of the pushrod 140 and to be coupled to the ramp unit 150.

The ramp unit 150 includes the fixing ramp plate 151 fixed to and installed at the cylinder 123, a rotating ramp plate 156 coupled to the connector 180 connected to the actuator 170 to be described and configured to be rotated by receiving a rotational force, and a plurality of balls 158 interposed between the pushrod 140 and the rotating ramp plate 156.

The fixing ramp plate 151 is provided in a cylindrical shape of which a front part is opened. Inside such a fixing ramp plate 151, the flange 142 of the pushrod 140 is located, and, as described above, the coupling recessed groove 153 is formed to enable the coupling protrusion 143 of the flange 142 to be fitted therein.

Meanwhile, the fixing ramp plate 151 is installed inside the cylinder 123 to be prevented rotation thereof. As shown in the drawings, a rotation prevention protrusion 154 protruding in an outward direction is formed at a rear part of the fixing ramp plate 151, and a rotation prevention recessed groove 124 corresponding to the rotation prevention protrusion 154 is formed at a position corresponding thereto inside the cylinder 123. With such a configuration, the rotation prevention protrusion 154 is inserted into the rotation prevention recessed groove 124 such that rotation of the fixing ramp plate 151 is prevented, and also the pushrod 140 coupled to the fixing ramp plate 151 is prevented from being rotated.

The rotating ramp plate 156 includes a shaft 156$b$ protruding to an outward side of the caliper housing 120 by passing through the rear part of the fixing ramp plate 151 and a rear part of the cylinder 123, and a pressurizing unit 156$a$ provided inside the fixing ramp plate 151 and formed to extend from an end of the shaft 156$b$ in a radius direction. At this point, the shaft 156$b$ protruding to the outward side of the caliper housing 120 is coupled to the connector 180 to be described to receive a rotational force therethrough.

Meanwhile, a reference numeral '159' not described is a bearing interposed between the rotating ramp plate 156 and the fixing ramp plate 151 to support rotation of the rotating ramp plate 156.

The plurality of balls 158 are interposed between mutually facing surfaces of the rotating ramp plate 156 and the pushrod 140, and guide recessed grooves 157 are formed at the mutually facing surfaces. Each of the guide recessed grooves 157 is provided to be inclined to move the ball 158 along the inclined recessed groove as the rotating ramp plate 156 is rotated, thereby causing the pushrod 140 to make a rectilinear movement. A configuration of the rectilinear movement using the ball 158 is well known in the related art such that a detailed description thereof will be omitted.

The spring case 160 is provided to form a predetermined accommodation space between the pushrod 140 and an inward surface of the cylinder 123. In particular, one end of the spring case 160 is fixed to the inward surface of the cylinder 123 by means of a snap ring 163, and the elastic members 161 and 162 are provided in the spring case 160 to return the pushrod 140 and a supporting plate 165 to be described to initial positions thereof, thereby restoring the piston 121.

The elastic members 161 and 162 include a low pressure spring 162 and a high pressure spring 161, and these springs 162 and 161 are disposed in parallel inside the spring case 160. In accordance with one aspect of the present disclosure, the supporting plate 165 is further provided to support one end of the high pressure spring 161 and to be installed slidably at the cylinder 123 so as to enable the low pressure spring 162 and the high pressure spring 161 to mutually form a gap in a length direction.

A through hole 166 is formed at a center of the supporting plate 165, and a rim portion of the supporting plate 165 is seated on a front end surface 155 of a front side of the fixing ramp plate 151. At this point, the front end surface 155 of the fixing ramp plate 151 is formed to more protrude in the advance direction of the piston 121 than a front end surface of the flange 142 disposed inside the fixing ramp plate 151. Consequently, the front end surface of the flange 142 and the front end surface 155 of the fixing ramp plate 151 form a step such that a gap G may be formed between the supporting plate 165 and the flange 142. In other words, as shown in the drawings, one end of the low pressure spring 162 is supported by the flange 142 through the through hole 166 of the supporting plate 165 and the other end thereof is supported by the other end surface of the spring case 160. Also, the high pressure spring 161 is spaced apart from the low pressure spring 162 by a predetermined gap, one end of the high pressure spring 161 is supported by the supporting plate 165 and the other end thereof is supported by the other end surface of the spring case 160.

Figure 5:
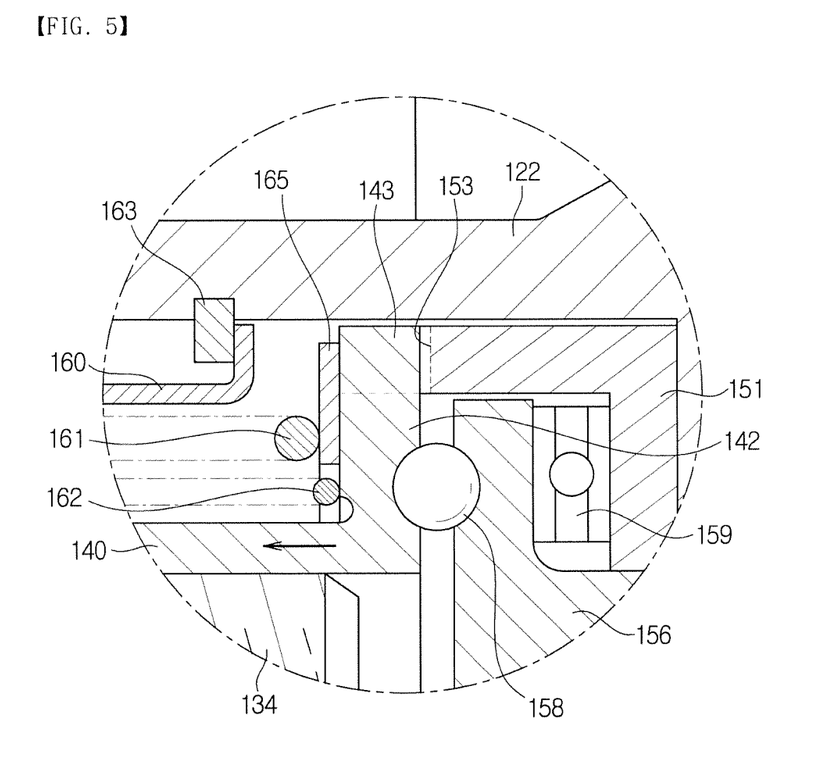
FIG. 5 and FIG. 6 are each illustrating an operating state of an electric disc brake according to one embodiment of the present disclosure.
Figure 6:
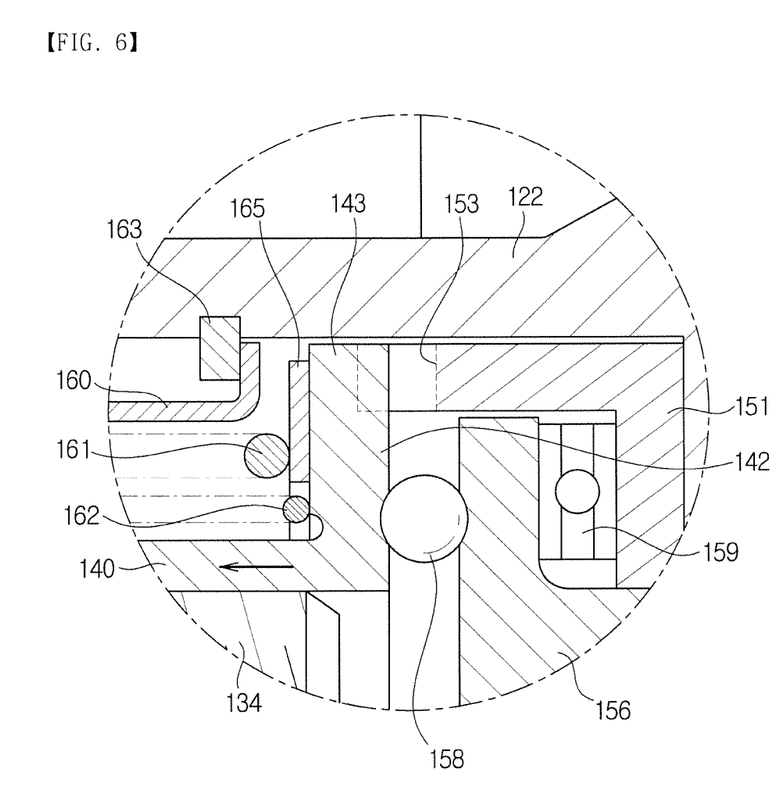

With such a structure for supporting the low pressure spring 162 and the high pressure spring 161, prior to activating the electric disc brake 100, the low pressure spring 162 is provided to be supported by the flange 142 and the high pressure spring 161 is provided to be supported by the supporting plate 165. In this state, when the pushrod 140 is pressurized by the rotating ramp plate 156 receiving a rotational force from the actuator 170 to be described upon activating a brake operation, as shown in FIG. 5, the low pressure spring 162 supported by the flange 142 of the pushrod 140 is firstly compressed as much as the gap G between the flange 142 and the supporting plate 165 and then, as shown in FIG. 6, the flange 142 comes in contact with the supporting plate 165 to move the pushrod 140 and the supporting plate 165 together. In other words, the supporting plate 165 supports the high pressure spring 161 such that the low pressure spring 162 and the high pressure spring 161 are compressed together.

The actuator 170 includes a motor 172 configured to generate a brake force, a decelerator configured to reduce a rotational force of the motor 172 and including a plurality of gears, and a housing 171 configured to accommodate the motor 172 and the decelerator and installed at an outward side of the caliper housing 120.

The decelerator has a two-stage deceleration structure in which a plurality of gears are in engagement with each other to decelerate a rotational force of the motor 172 which rotates and reversely rotates by receiving electrical power. As shown in the drawings, the decelerator is a two-stage worm wheel deceleration structure, and includes a first worm 174 coupled to a rotating shaft 173 of the motor 172, a worm shaft 177 including a first worm wheel 175 in engagement with the first worm 174, a second worm 176 spaced apart from the first worm wheel 175 by a predetermined distance to be provided at the worm shaft 177, and a second worm wheel 178 configured to be rotated in engagement with the second worm 176. At this point, the second worm wheel 178 is a gear outputting a decelerated rotational force and it will be described below as an output gear 178. On one lateral surface of the output gear 178, at least one protrusion 179 spaced apart from a center in a radius direction by a predetermined distance is formed. The protrusion 179 is provided to deliver a rotational force to the connector 180 to be described only in one direction, and a structure for delivering a rotational force through the protrusion 179 will be described below.

Although the decelerator of the electric disc brake 100 according to the present disclosure having the worm wheel deceleration structure has been shown and described, it is not limited thereto, and a variety of gear assembly structures including a spur gear assembly structure and the like capable of receiving a rotational force of the motor 172 may be employed. In other words, the decelerator may employ any kind of gear assembly structure capable of decelerating a rotational force and delivering the decelerated rotational force through the output gear 178.

In accordance with one embodiment of the present invention, the connector 180 installed at the output gear 178 is provided to deliver a rotational force to the rotating ramp plate 156 of the ramp unit 150. The connector 180 is provided to deliver a rotational force only in one direction through the output gear 178, and an assembly structure of such a connector 180 is shown in FIG. 7.

Figure 7:
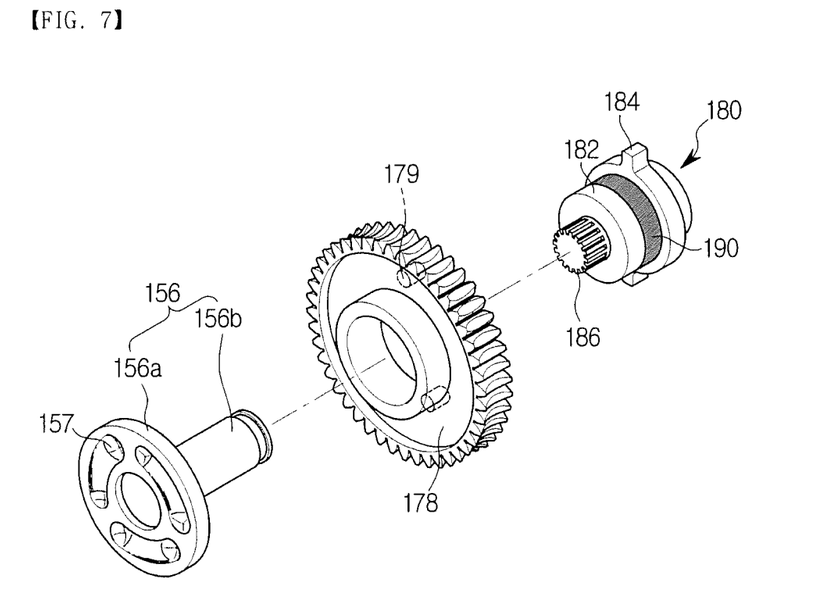
FIG. 7 is an exploded perspective view illustrating a coupling state of a rotating ramp plate and an output gear through a connector in an electric disc brake according to one embodiment of the present disclosure.

With reference to FIG. 7, the connector 180 is rotatably installed at a center of the output gear 178 and coupled to the rotating ramp plate 156 to be rotated together therewith. More particularly, the connector 180 includes a body 182 rotatably installed at the center of the output gear 178, a coupling unit 186 provided at one side of the body 182 to be coupled to the rotating ramp plate 156, and at least one supporting unit 184 provided at the other side of the body 182 and formed to extend in a radius direction. At this point, the supporting unit 184 is located at an outward side of the output gear 178. In other words, the supporting unit 184 is located in a circumferential direction at which the protrusion 179 is rotated so as to receive a rotational force by the protrusion 179.

Figure 8:
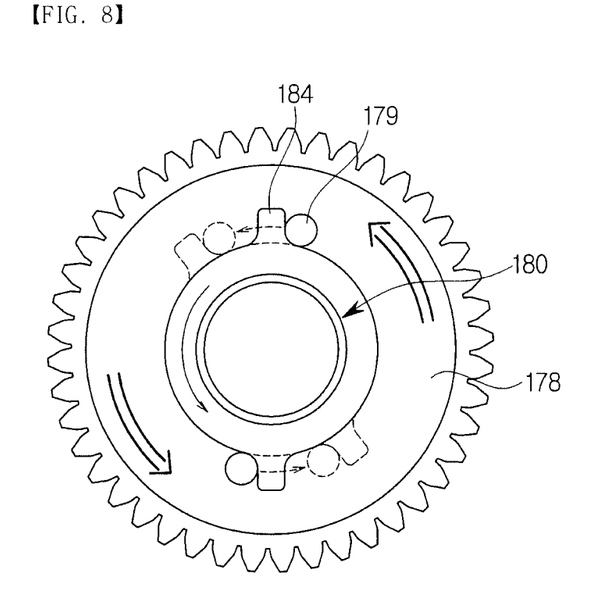
FIG. 8 is illustrating of delivering state of a rotational force through the connector in an electric disc brake according to one embodiment of the present disclosure.

As described above, the connector 180 is rotatably installed at the output gear 178 and thus, when the output gear 178 is rotated in a direction at which a parking brake force is generated, the connector 180 is rotated from a time when the protrusion 179 comes in contact with the supporting unit 184, thereby delivering the rotational force to the rotating ramp plate 156, as shown in FIG. 8. In other words, the rotating ramp plate 156 coupled to the connector 180 is rotated together therewith.

Figure 9:
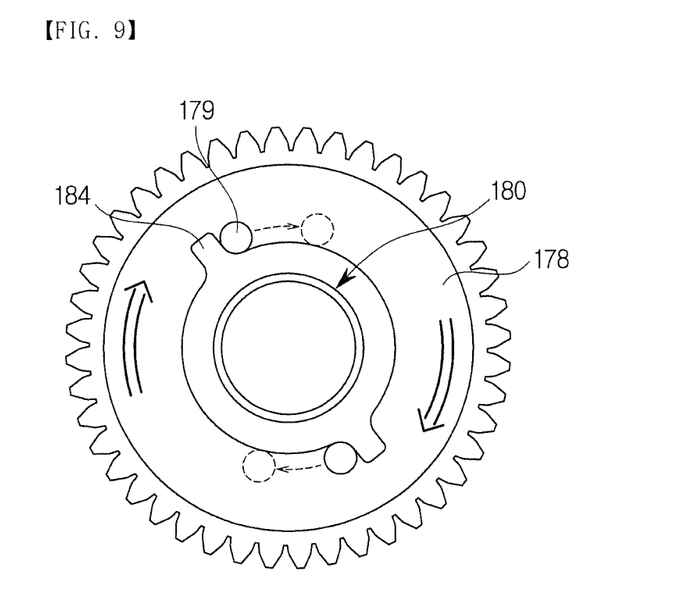
FIG. 9 and FIG. 10 are each illustrating a releasing state of a parking brake force through the connector in an electric disc brake according to one embodiment of the present disclosure.
Figure 10:
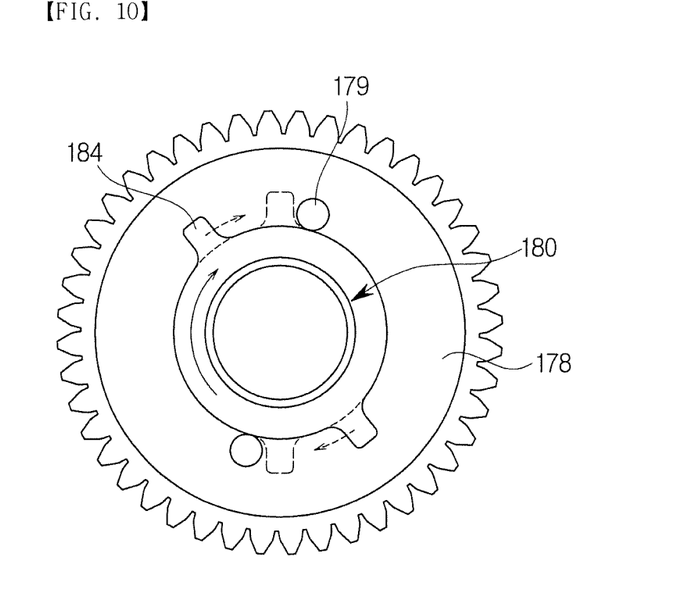

Meanwhile, the electric disc brake 100 according to one embodiment of the present disclosure is provided to deliver a rotational force only in a direction at which the parking brake force is generated by means of the connector 180. In particular, with reference to FIGS. 9 and 10, when the output gear 178 is rotated in a direction at which the parking brake force is released, the protrusion 179 is rotated in a direction away from the supporting unit 184 such that a rotational force is not delivered to the connector 180. Simultaneously, according to a reaction force generated by a pressure applied to the piston 121, the rotating ramp plate 156 is pressurized by the pushrod 140 such that the rotating ramp plate 156 is rotated. In other words, the connector 180 is reversely rotated as much as a rotation amount of the rotating ramp plate 156 in a direction at which the parking brake force is generated, thereby being rotated together with the rotating ramp plate 156. Consequently, even though the output gear 178 is rotated in the direction at which the parking brake force is released, the connector 180 is rotated in a direction the same as a rotation direction of the output gear 178 and thus a contact between the protrusion 179 and the supporting unit 184 does not occur to cause no power transmission through the protrusion 179. That is, as described above, a self-locking is not possible owing to a characteristic of the ramp unit 150 and thus a power transmission is not caused upon releasing the parking brake force due to not only generation of a rotational force of the rotating ramp plate 156 in a direction at which the parking brake force is released by a weight applied to the friction pads 113 and 114 but also rotation of the rotating ramp plate 156 together with the connector 180 by means of the pushrod 140 pressurized by the elastic members 161 and 162.

Meanwhile, the electric disc brake 100 according to one embodiment of the present disclosure returns the rotating ramp plate 156 using a reaction force generated by a weight applied to the piston 121 upon activating a brake operation, and more, to prevent the rotating ramp plate 156 from not returning to an initial position thereof for a period in which the reaction force is small, a friction member 190 is installed at the connector 180 so as to return the rotating ramp plate 156 to the initial position.

Figure 11:
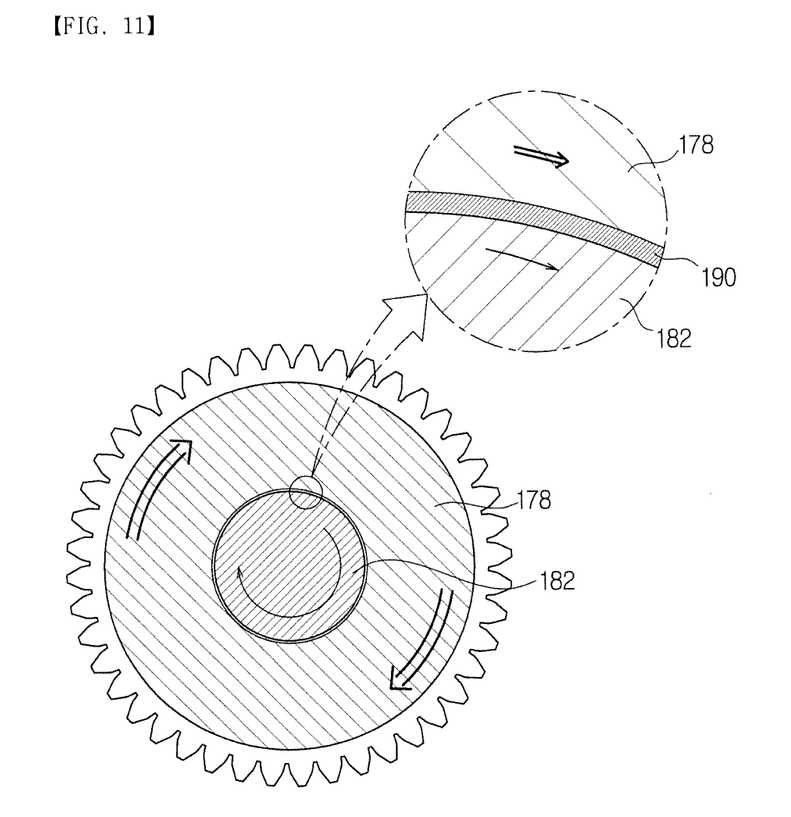
FIG. 11 is illustrating of rotating state an output gear and a connector together according to a rotational resistance of a friction member in an electric disc brake according to one embodiment of the present disclosure.

As shown in FIGS. 7 and 11, the friction member 190 is installed at an accommodation recessed groove 181 formed along an outer circumferential surface of the body 182 of the connector 180. Such a friction member 190 is provided to have a constant rotational resistance against the output gear 178. In other words, a friction force is generated between the friction member 190 and the output gear 178.

Hereinafter, a returning to the initial position of the rotating ramp plate 156 through the friction member 190 will be described below.

Firstly, when a parking brake force is released, the rotating ramp plate 156 is rotated by elastic restoring force of the elastic members 161 and 162 pressurized by the pushrod 140. In other words, the ball 158 pressurized by the pushrod 140 moves along an inclined surface such that the rotating ramp plate 156 is rotated. At this point, during a period in which a reaction force is small when the supporting plate 165 supporting the high pressure spring 161 of the elastic members 161 and 162 is seated on the front end surface 155 of the fixing ramp plate 151 and the pushrod 140 is elastically supported only by means of the low pressure spring 162, the rotating ramp plate 156 is not smoothly rotated. In other words, torque of the pushrod 140 pressurizing the rotating ramp plate 156 is less than the friction force between the friction member 190 and the output gear 178, and thus a rotational resistance due to the friction force of the friction member 190 is added such that the connector 180 is rotated together with the output gear 178.

From a time when the rotating ramp plate 156 returns to the initial position, torque between the connector 180 and the rotating ramp plate 156 is increased by resistance of the ball 158 such that the friction member 190 slides against the output gear 178 and only the output gear 178 is rotated. At this point, the output gear 178 is rotated as much as a control margin and a control is terminated.

As a result, the electric disc brake 100 according to one embodiment of the present disclosure is provided to receive a rotational force only in a direction at which the parking brake force is generated through a coupling structure of the connector 180 such that the rotational force is not delivered to the rotating ramp plate 156 to prevent a damage to the ramp unit 150 even though the rotational force is excessively generated when the parking brake force is released.

As described above, although the present disclosure has been described by way of a specific embodiment and the accompanying drawings, it is not limited thereto, and it should be understood that numerous other changes and modifications can be devised by those skilled in the art that will fall within the spirit and scope of this disclosure and along with the full range of equivalents to which the appended claims are entitled.

What is claimed is:

1. An electric disc brake comprising:
    a caliper housing configured to include a cylinder at which a piston is installed to be reciprocally movable by a brake hydraulic pressure;
    an adjuster arranged inside the piston;
    a pushrod provided inside the cylinder;
    an actuator configured to decelerate a rotational force according to an activation of a motor to output the decelerated rotational force and configured to pressurize the piston; and
    a ramp unit installed inside the cylinder, the ramp unit configured to receive the decelerated rotational force from the actuator to pressurize the pushrod toward the piston and prevent rotation of the pushrod,
    wherein the actuator includes an output gear rotatably connected to the motor,
    wherein the electric disc brake further comprises a connector configured to deliver the decelerated rotational force of the output gear to the ramp unit in one direction,
    wherein the connector and the output gear deliver the rotational force of the motor when the motor is activated in a direction pressurizing the piston, and do not deliver the rotational force of the motor when the motor is activated in a direction not pressurizing the piston, and
    wherein at least one protrusion spaced apart from a center of the output gear in a radial direction by a predetermined distance is formed at one lateral surface of the output gear, the connector is rotatably installed at the center of the output gear to be coupled to a rotating ramp plate of the ramp unit, and a supporting unit is provided in a circumferential direction at which the at least one protrusion is rotated so as to receive the rotational force through the protrusion formed at the output gear.

2. The electric disc brake of claim 1, wherein the pushrod includes a front part screw-coupled to the adjuster and a rear part at which a flange extending in a radial direction is formed,
    wherein the electric disc brake further comprises:
        an elastic member provided in a spring case formed between an inner circumferential surface of the cylinder and the pushrod and configured to provide an elastic force to the pushrod.

3. The electric disc brake of claim 1, wherein the connector is rotated in a direction at which the output gear generates a parking brake force when the protrusion comes in contact with the supporting unit, thereby delivering the rotational force to the rotating ramp plate.

4. The electric disc brake of claim 3, wherein the protrusion is rotated in a direction away from the supporting unit when the output gear is rotated in a direction at which the parking brake force is released, and the connector is reversely rotated as much as a rotation amount of the rotating ramp plate in the direction at which the parking brake force is generated to be rotated together with the rotating ramp plate, thereby preventing the protrusion and the supporting unit from coming in contact with each other.

5. The electric disc brake of claim 1, wherein a friction member is installed at an outer circumferential surface of the connector to apply a constant rotational resistance against the output gear.

6. The electric disc brake of claim 5, wherein, when a parking brake force is released, if torque of the pushrod pressurizing the rotating ramp plate is less than a friction force between the friction member and the output gear, the connector is rotated together with the output gear.

7. The electric disc brake of claim 6, wherein, when the rotating ramp plate returns to an initial position, torque between the connector and the rotating ramp plate is increased such that the friction member slides against the output gear and the output gear is rotated alone.

8. The electric disc brake of claim 1, wherein the connector includes:
    a body rotatably installed at the center of the output gear;
    a coupling unit provided at one side of the body to be coupled to the rotating ramp plate; and
    a supporting unit provided at the other side of the body and formed to extend in the radius direction.

9. The electric disc brake of claim 1, wherein the ramp unit includes:
    a fixing ramp plate having a front part being opened and fixed to the cylinder;
    the rotating ramp plate provided inside the fixing ramp plate and coupled to the connector by passing through a rear part of the fixing ramp plate and a rear part of the cylinder to be rotated by receiving the rotational force; and a plurality of balls interposed between the rotating ramp plate and the pushrod to advance the pushrod when the rotating ramp plate is rotated.

10. The electric disc brake of claim 9, wherein a rotation prevention protrusion protruding in an outward direction is formed at the rear part of the fixing ramp plate, and a rotation prevention recessed groove corresponding to the rotation prevention protrusion is formed at a position corresponding thereto inside the cylinder.

11. The electric disc brake of claim 9, wherein the pushrod includes a plurality of coupling protrusions spaced apart from each other at a regular interval along an outer circumferential surface of the flange and protruding in an outward direction, and coupling recessed grooves corresponding to the plurality of coupling protrusions are formed at positions corresponding to the plurality of coupling protrusions on an inner circumferential surface of the fixing ramp plate, the coupling recessed grooves configured to prevent rotation of the pushrod.

12. The electric disc brake of claim 9, wherein the elastic member includes a low pressure spring and a high pressure spring which are provided in parallel in an accommodation space of the spring case to provide an elastic force to the pushrod.

13. The electric disc brake of claim 12, further comprising:

a supporting plate configured to support one end of the high pressure spring and enable the low pressure spring and the high pressure spring to form a gap in a length direction and slidably installed at the cylinder.

14. The electric disc brake of claim 13, wherein a through hole is formed at a center of the supporting plate to seat the supporting plate on a front end surface of a front side of the fixing ramp plate, and the front end surface of the fixing ramp plate is formed to more protrude than a front end surface of the flange arranged inside the fixing ramp plate to form a step between the front end surfaces, thereby forming a gap between the supporting plate and the flange.

15. The electric disc brake of claim 1, wherein the adjuster includes:

a head portion configured to contact the piston; and a rod extending from the head portion in a rear direction and having an outer circumferential surface at which screw threads are formed, the rod configured to be screw-coupled to the pushrod, wherein a washer is installed at a rear wall of the head portion of the adjuster and an inward surface of the piston, and a washer spring is provided between the washers to tightly contact the adjuster with the piston by an elastic force of the washer spring.

* * * * *